(12) United States Patent
Inumaru et al.

(10) Patent No.: US 12,435,234 B2
(45) Date of Patent: Oct. 7, 2025

(54) INK COMPOSITION

(71) Applicant: DNP FINE CHEMICALS CO., LTD., Yokohama (JP)

(72) Inventors: Masaki Inumaru, Yokohama (JP); Yasuma Saito, Yokohama (JP); Koujun Utaka, Yokohama (JP); Karuna Iwasawa, Yokohama (JP)

(73) Assignee: DNP FINE CHEMICALS CO., LTD., Yokohama (JP)

( * ) Notice: Subject to any disclaimer, the term of this patent is extended or adjusted under 35 U.S.C. 154(b) by 233 days.

(21) Appl. No.: 18/032,921

(22) PCT Filed: Nov. 15, 2021

(86) PCT No.: PCT/JP2021/041961
§ 371 (c)(1),
(2) Date: Apr. 20, 2023

(87) PCT Pub. No.: WO2022/107732
PCT Pub. Date: May 27, 2022

(65) Prior Publication Data
US 2023/0399532 A1 Dec. 14, 2023

(30) Foreign Application Priority Data
Nov. 20, 2020 (JP) .................................. 2020-193725

(51) Int. Cl.
*C09D 11/38* (2014.01)
*B41M 5/52* (2006.01)
*C09D 11/32* (2014.01)

(52) U.S. Cl.
CPC ........... *C09D 11/38* (2013.01); *B41M 5/5227* (2013.01); *C09D 11/32* (2013.01)

(58) Field of Classification Search
CPC ..... B41J 11/00214; B41J 2/01; C09D 11/322; C09D 4/00; C09D 133/14; C09D 11/38;
(Continued)

(56) References Cited

U.S. PATENT DOCUMENTS 11,787,961 B2 * 10/2023 Sato ...................... C09D 11/38
347/20
2004/0126510 A1 * 7/2004 Wood .................... C09D 11/38
106/31.75
(Continued)

FOREIGN PATENT DOCUMENTS

JP 2012-188478 A 10/2012
JP 2012-214603 A 11/2012
(Continued)

OTHER PUBLICATIONS

Jul. 20, 2021 Office Action issued in Japanese Patent Application No. 2021-080717.
(Continued)

*Primary Examiner* — John Zimmermann
(74) *Attorney, Agent, or Firm* — Oliff PLC

(57) ABSTRACT

An ink composition able to yield a printed adherend having high weathering resistance; wherein, this ink composition is an active energy ray curing type ink composition that is discharged using an inkjet method. The ink composition contains a polymerizable compound, an ultraviolet radiation absorber and an antioxidant. The ultraviolet radiation absorber has a maximum absorption wavelength within the range 315-400 nm. A medium containing the ultraviolet radiation absorber at a concentration of 20 ppm has an absorbance area Ab of 25.0 or more at wavelengths within the range of 315-400 nm.

8 Claims, 1 Drawing Sheet

(58) Field of Classification Search
CPC ....... B41M 7/0045; B41M 5/52; C08G 18/44; B05D 3/06
See application file for complete search history.

(56) References Cited

U.S. PATENT DOCUMENTS

| | | | |
|---|---|---|---|
| 2004/0192684 A1* | 9/2004 | Ravichandran | C07D 405/04 |
| | | | 544/73 |
| 2016/0054478 A1* | 2/2016 | Otani | C08F 290/062 |
| | | | 428/141 |
| 2017/0021641 A1* | 1/2017 | Goi | C09D 11/107 |
| 2019/0100665 A1 | 4/2019 | Kondo et al. | |
| 2021/0206175 A1* | 7/2021 | Sasada | C09D 11/38 |
| 2022/0032660 A1* | 2/2022 | Yoda | C09D 11/101 |
| 2022/0281241 A1* | 9/2022 | Sawase | C09D 11/101 |

FOREIGN PATENT DOCUMENTS

| | | |
|---|---|---|
| JP | 2012-241057 A | 12/2012 |
| JP | 2018-100353 A | 6/2018 |
| JP | 2019-505648 A | 2/2019 |
| JP | 2019-183374 A | 10/2019 |
| JP | 2020-193725 A | 12/2020 |
| WO | 2017/100122 A1 | 6/2017 |
| WO | 2018/021352 A1 | 2/2018 |
| WO | 2018/070438 A1 | 4/2018 |

OTHER PUBLICATIONS

Oct. 19, 2021 Office Action issued in Japanese Patent Application No. 2021-080717.
Feb. 1, 2022 Search Report issued in International Patent Application No. PCT/JP2021/041961.
Sep. 23, 2024 Extended Search Report issued in European Patent Application No. 21894606.9.

* cited by examiner

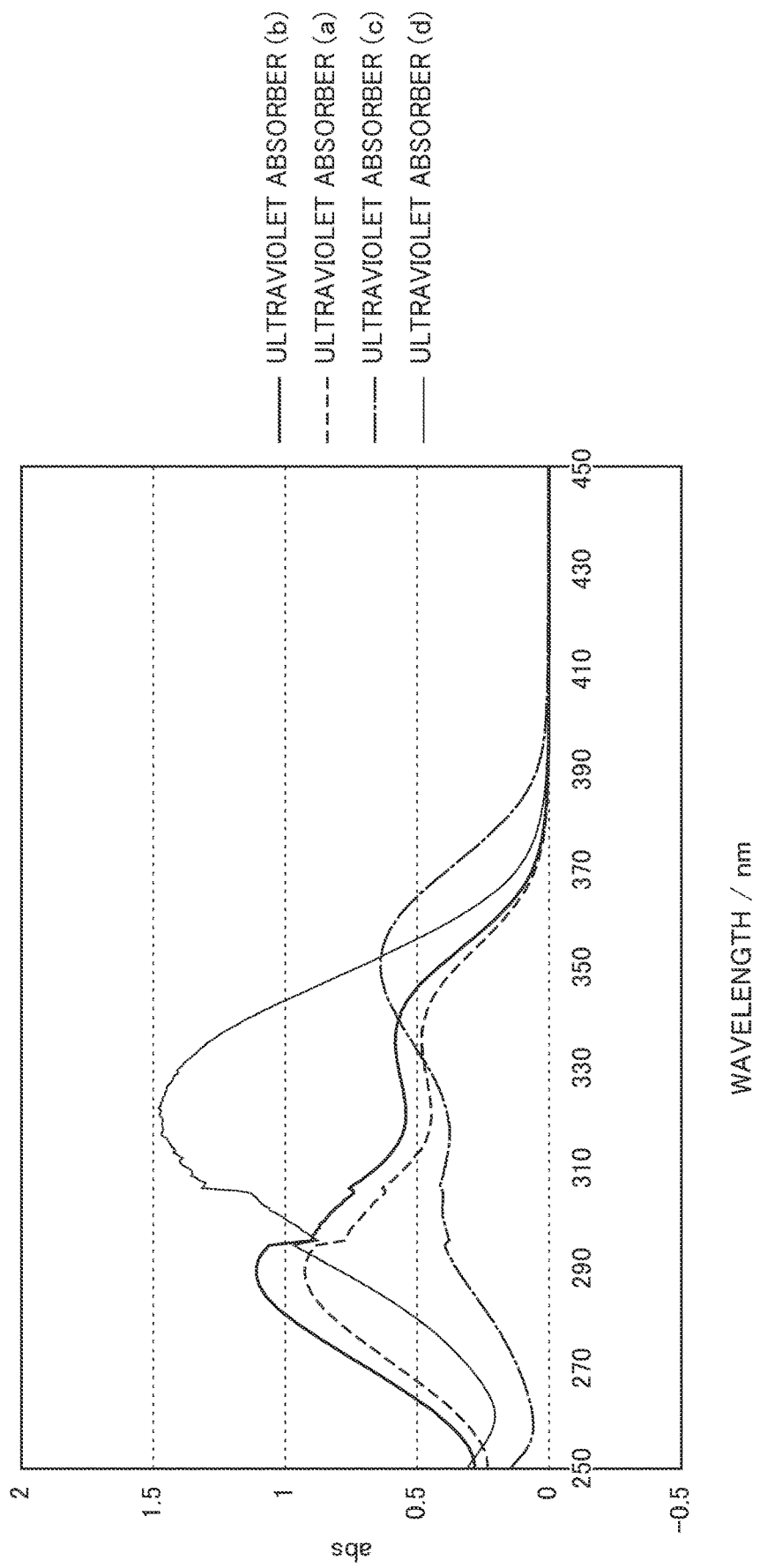

INK COMPOSITION

TECHNICAL FIELD

The present invention relates to an ink composition that improves weathering resistance of an adherend mainly by discharging the ink composition onto the surface of the adherend.

BACKGROUND ART

In recent years, provision of a variety of printed matters in small lots has been increasing, and an inkjet printing method which is an on-demand printing method has attracted attention as an alternative to a conventional offset printing method. The inkjet printing method is simpler than the conventional off-set printing method, and has advantages such as economic efficiency and energy saving.

In such an inkjet printing method, there is an active energy ray-curable ink composition which is cured by active energy rays such as ultraviolet rays. Since the active energy ray-curable ink composition has quick dry properties, bleeding of ink can be prevented even when printing is performed on a substrate which does not absorb or hardly absorbs ink, such as plastics, glass, coated paper, or the like.

For example, Patent Document 1 discloses an active energy ray-curable ink composition containing a predetermined amount of a polymerizable compound, a polymerization initiator, and a photo stabilizer. Patent Document 1 describes that this ink composition has discharging stability in an inkjet printer and a printed matter excellent in weathering resistance can be obtained.

Patent Document 1: Japanese Unexamined Patent Application, Publication No. 2012-214603

DISCLOSURE OF THE INVENTION

Problems to be Solved by the Invention

Patent Document 1 only discloses a technique relating to an ink composition containing a coloring material for obtaining a printed matter. Therefore, a coloring layer itself which contains a coloring material is exposed, and there is a problem that weathering resistance is insufficient when the printed matter undergoes outdoor exposure.

An object of the present invention is to provide an ink composition capable of obtaining a printed matter having high weathering resistance.

Means for Solving the Problems

As a result of extensive investigations to solve the above-mentioned problem, the present inventors have found that an ink composition containing a predetermined ultraviolet absorber can solve the above-mentioned problem and completed the present invention. Specifically, the present invention provides the following.

(1) An active energy ray-curable ink composition to be discharged by an inkjet method, including a polymerizable compound, an ultraviolet absorber, and an antioxidant, the ultraviolet absorber having a maximum absorption wavelength in a wavelength range of 315 nm or more and 400 nm or less, a medium containing the ultraviolet absorber at a concentration of 20 ppm having an absorbance area Ab in a wavelength range of 315 nm or more and 400 nm or less of 25.0 or more.

(2) The ink composition as described in aspect (1), wherein the antioxidant includes an NH-type hindered amine compound.

(3) The ink composition as described in aspect (1) or (2), wherein the content of a coloring material is 1.0% by mass or less with respect to the total amount of the ink composition.

(4) A printed matter, including an adherend and a weatherable layer formed on the surface of the adherend, the weatherable layer including a cured product of a polymerizable compound, an ultraviolet absorber, and an antioxidant, the ultraviolet absorber having a maximum absorption wavelength in a wavelength range of 315 nm or more and 400 nm or less, a medium containing the ultraviolet absorber at a concentration of 20 ppm having an absorbance area Ab in a wavelength range of 315 nm or more and 400 nm or less of 25.0 or more.

(5) The printed matter as described in aspect (4), wherein the weatherable layer has an absorbance area Abl in a wavelength range of 315 nm or more and 400 nm or less of 30.0 or more.

(6) A recording method, including discharging an active energy ray-curable ink composition by an inkjet method, the ink composition including a polymerizable compound, an ultraviolet absorber, and an antioxidant, the ultraviolet absorber having a maximum absorption wavelength in a wavelength range of 315 nm or more and 400 nm or less, a medium containing the ultraviolet absorber at a concentration of 20 ppm having an absorbance area Ab in a wavelength range of 315 nm or more and 400 nm or less of 25.0 or more.

(7) A method for producing a printed matter, including discharging an active energy ray-curable ink composition by an inkjet method,
the ink composition including a polymerizable compound, an ultraviolet absorber, and an antioxidant,
the ultraviolet absorber having a maximum absorption wavelength in a wavelength range of 315 nm or more and 400 nm or less, and a medium containing the ultraviolet absorber at a concentration of 20 ppm having an absorbance area Ab in a wavelength range of 315 nm or more and 400 nm or less of 25.0 or more.

Effects of the Invention

The ink composition of the present invention can provide a printed matter with high weathering resistance.

BRIEF DESCRIPTION OF THE DRAWINGS

FIG. 1 is an absorbance curve showing absorbance of each ultraviolet absorber measured by a predetermined method.

PREFERRED MODE FOR CARRYING OUT THE INVENTION

Hereinafter, specific embodiments of the present invention will be described in detail, but the present invention is not limited to the following embodiments, and the present invention can be carried out with appropriate modifications within the scope of the object of the present invention.

<1. Ink Composition>

The ink composition according to the present embodiment is an active energy ray-curable ink composition discharged by an inkjet method. The ink composition contains a polymerizable compound, an ultraviolet absorber, and an antioxidant. The ink composition is discharged onto a surface of an adherend by an inkjet method.

When the ink composition discharged onto the surface of the adherend is irradiated with an active energy ray, a weatherable layer containing a cured product of the polymerizable compound, the ultraviolet absorber, and the antioxidant is formed on the surface of the adherend, and a weathering resistance of the adherend can be improved by the weatherable layer. The cured product of the polymerizable compound means a cured product (polymer) formed by polymerizing at least part of the polymerizable compound contained in the ink composition. The cured product may contain an unreacted (uncured) polymerizable compound. In the present specification, the adherend may be a surface itself of a recording medium, or may be a surface of a recording medium in which a colored layer is laminated on part or the entirety of the surface of the recording medium and is not particularly limited. Further, as will be described in detail later, in the present specification, the term "colored layer" refers to a layer containing a coloring matter (dye or pigment) used in ordinary ink compositions, and mainly refers to a layer expressing an image (including photographs or characters) of a printed matter.

This active energy ray-curable ink composition is characterized by containing an ultraviolet absorber having a maximum absorption wavelength in a wavelength range of 315 nm or more and 400 nm or less and an absorbance area Ab of 25.0 or more in a wavelength range of 315 nm or more and 400 nm or less as measured under predetermined conditions. By forming a weatherable layer formed by such an ink composition on the surface of an adherend, the weathering resistance of the adherend can be improved. In addition, the ink composition contains a predetermined antioxidant, thereby effectively suppressing discoloration (yellowing) of the weatherable layer due to exposure of the weatherable layer for a long time.

Accordingly, the printed matter obtained by the ink composition according to the present embodiment does not change the appearance of the adherend even when it is exposed for a long time, and the weathering resistance is extremely high.

Although details will be described later, the weatherable layer formed by the ink composition according to the present embodiment may be intentionally made to have a non-uniform thickness to make the surface matte or glossy, or made to have a three-dimensional weatherable layer having irregularities and high design properties.

Each component contained in the ink composition according to the present embodiment will be described below.

[Ultraviolet Absorber]

The ultraviolet absorber is a compound (monomer, oligomer, or polymer) having an absorption wavelength in the ultraviolet region. Specifically, the ultraviolet absorber has a maximum absorption wavelength in a wavelength range of 315 nm or more and 400 nm or less and a medium containing the ultraviolet absorber at a concentration of 20 ppm has an absorbance area Ab in a wavelength range of 315 nm or more and 400 nm or less of 25.0 or more.

The absorbance area Ab of the ultraviolet absorber is defined by an absorbance area measured by the following method. That is, a solution (medium A) is prepared by dissolving an ultraviolet absorber to be measured in 1-propanol at a concentration of 20 ppm. Then, presuming that medium A containing the ultraviolet absorber as a sample, and medium B (1-propanol) not containing an ultraviolet absorber as a reference light, each medium is injected into a quartz cell having a path length of 1 cm, and the absorbance at each wavelength is obtained by a spectrophotometer (UV-1800 manufactured by Shimadzu Corporation). An integrated value of difference in the absorbances in the wavelength range of 315 nm or more and 400 nm or less is defined as the absorbance area Ab of the ultraviolet absorber.

When a measurement interval of the measurement wavelength is, for example, 0.5 nm, the integrated value of the absorbance refers to an area obtained by adding an area of a quadrangle (trapezoid) calculated from ((absorption at wavelength X nm)+(absorption at wavelength (X+0.5) nm))×0.5/2, with respect to X, between 315 nm and 400 nm. The maximum absorption wavelength of the ultraviolet absorber can also be obtained from an absorbance curve obtained by this method.

In general, among the ultraviolet rays contained in sunlight, most of the ultraviolet rays of short wavelengths such as UV-C and UV-B are absorbed by the ozone layer existing in the atmosphere, so that the ultraviolet rays actually reaching the ground have a wavelength of about 315 to 400 nm (so-called UV-A). Thus, among ultraviolet absorbers, the ink composition according to the present embodiment contains an ultraviolet absorber having a maximum absorption wavelength in the wavelength range of 315 nm or more and 400 nm or less, the absorbance area Ab thereof being 25.0 or more in the wavelength range of 315 nm or more and 400 nm or less, whereby the weatherable layer absorbs ultraviolet rays having a wavelength of about 315 nm or more and 400 nm or less that could have actually reached the ground, thereby suppressing the amount of ultraviolet rays that could have reached the adherend, resulting in effective improvement in the weatherable property of the adherend.

FIG. 1 shows absorbances obtained by the above method with regard to an ultraviolet absorber (a) (2-[4-([2-hydroxy-3-dodecyloxypropyl)oxy]-2-hydroxyphenyl]-4,6-bis(2,4-dimethylphenyl)-1,3,5-triazine), an ultraviolet absorber (b) (2-[4-[(2-hydroxy-3-(2'-ethyl)hexyl)oxy]-2-hydroxyphenyl]-4,6-bis(2,4-dimethylphenyl)-1,3,5-triazine), an ultraviolet absorber (c) (2,4,6-tris[4-(1-octyloxycarbonyl)ethoxy-2-hydroxyphenyl]-1,3,5-triazine), and an ultraviolet absorber (d) (isooctyl 2-[4-[4,6-bis[(1,1'-biphenyl)-4-yl]-1,3,5-triazine-2-yl]-3-hydroxyphenoxy]propanoate).

TABLE 1

| Ultraviolet absorber | Absorbance area Ab | Maximum absorption wavelength |
| --- | --- | --- |
| Ultraviolet absorber (a) | 19.8 | 290 |
| Ultraviolet absorber (b) | 23.9 | 290 |
| Ultraviolet absorber (c) | 32.1 | 350 |
| Ultraviolet absorber (d) | 52.4 | 322 |

From the above Table, it can be understood that the ultraviolet absorber (c) or the ultraviolet absorber (d) has a maximum absorption wavelength in a wavelength range of 315 nm or more and 400 nm or less, and the absorbance area Ab thereof is 25.0 or more.

As the ultraviolet absorber having a maximum absorption wavelength in the wavelength range of 315 nm or more and 400 nm or less, and an absorbance area Ab of 25.0 or more, among benzophenone compounds such as 2-hydroxy-4-n-octoxy-benzophenone, 2-hydroxy-4-dodecyloxy-benzophenone, 2-hydroxy-4-octadecyloxy-benzophenone, 2-hydroxy-4-benzyloxy-benzophenone, and 1,4-bis(4-benzoyl-3-hydroxyphenoxy)-butane; benzotriazole compounds such as 2-(2'-hydroxy-3',5'-di-t-butylphenyl)benzotriazole, 2-(2'-hydroxy-3'-t-butyl-5'-methylphenyl)benzotriazole, 2-(3,5- di-t-pentyl-2-hydroxyphenyl-2-benzotriazole, 2-(2-benzotriazol-2-yl)-4-methyl-6-(3,4,5,6-tetrahydrophthalidylmethyl)phenol, 2-(2-hydroxy-4-octyloxyphenyl)-2-benzotriazole, and 2-(2-hydroxy-5-t-octylphenyl)-2-benzotriazole; hydroxyphenyltriazine compounds such as 2,4-bis[2-hydroxy-4-butoxyphenyl]-6-(2,4-dibutoxyphenyl)-1,3-5-triazine, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2-(2-hydroxy-4-[1-octyloxycarbonylethoxy]phenyl)-4,6-bis(4-phenylphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, and 2,4-diphenyl-6-(2-hydroxy-4-benzyloxyphenyl)-1,3,5-triazine; and benzoate-based ultraviolet absorbers such as 2,4-di-t-butylphenyl-3,5-di-t-butyl-4-hydroxybenzoate and hexadecyl-3,5-di-t-butyl-4-hydroxybenzoate, those having a maximum absorption wavelength in the wavelength range of 315 nm or more and 400 nm or less and an absorbance area Ab of 25.0 or more can be mentioned. Inter alia, among hydroxyphenyltriazine-based ultraviolet absorbers, those having a maximum absorption wavelength in a wavelength range of 315 nm or more and 400 nm or less and an absorbance area Ab of 25.0 or more are preferable.

This absorbance area Ab in the range of 315 nm or more and 400 nm or less is preferably 30.0 or more, more preferably 40.0 or more, and particularly preferably 45.0 or more.

The ink composition according to the present embodiment may contain an ultraviolet absorber different from the ultraviolet absorbers having a maximum absorption wavelength in a wavelength range of 315 nm or more and 400 nm or less and an absorbance area Ab of 25.0 or more.

The content of the ultraviolet absorber is preferably 1.0% by mass or more, more preferably 1.5% by mass or more, and most preferably 1.7% by mass or more, with respect to the total amount of the ink composition. This can more effectively improve weathering resistance of an adherend. The content of the ultraviolet absorber is preferably 10.0% by mass or less, more preferably 5.0% by mass or less, and most preferably 3.0% by mass or less with respect to the total amount of the ink composition. Thereby, solubility of the ultraviolet absorber contained in the ink composition is improved, and inkjet discharge properties of the ink composition are improved.

[Antioxidants]

An antioxidant is a compound that captures hydroperoxides. The ink composition according to the present embodiment is characterized in that it contains a predetermined antioxidant in addition to the predetermined ultraviolet absorber described above. When a cured product (polymer) of the polymerizable compound contained in the weatherable layer is irradiated with ultraviolet rays, the energy of the ultraviolet rays is converted into thermal energy by the ultraviolet absorber contained in the weatherable layer, whereas the cured product (polymer) is converted into a radical by some of the ultraviolet rays that were not converted into thermal energy, and the radical bonds to oxygen in the air to form peroxide radicals (ROO·). The research by the present inventors has revealed that the peroxide radicals (ROO·) attack another polymer to form hydroperoxides (ROOH) in a chain reaction, and the weatherable layer is discolored (yellowed).

Therefore, by blending an antioxidant for capturing hydroperoxides in the ink composition according to the present embodiment, it is possible to effectively suppress discoloration (yellowing) of the weatherable layer.

Examples of such compounds that capture hydroperoxides include an NH-type hindered amine compound. The NH-type hindered amine compound is a compound having one or two or more piperidine structures having a hydrogen atom bonded to a nitrogen atom of a 2,2,6,6-tetramethylpiperidine skeleton in a molecule, and has a structure represented by the following formula:

[Chem. 1]

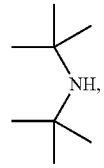

and the NH group can capture hydroperoxides.

Examples of such NH-type hindered amine compounds include: 2,2,6,6-tetramethyl-4-piperidyl stearate, 2,2,6,6-tetramethyl-4-piperidyl benzoate, bis(2,2,6,6-tetramethyl-4-piperidyl) sebacate, poly[{6-(1,1,3,3-tetramethylbutyl)amino-1,3,5-triazine-2,4-diyl}{(2,2,6,6-tetramethyl-4-piperidyl)imino}hexamethylene {(2,2,6,6-tetramethyl-4-piperidyl)imino}hexamethyl, bis(1-octoxy-2,2,6,6-tetramethyl-4-piperidyl) sebacate, 2,2,6,6-tetramethylpiperidyl methacrylate, tetrakis (2,2,6,6-tetramethyl-4-piperidyl)-1,2,3,4-butane tetracarboxylate, bis(1,2,2,6,6-pentamethyl-4-piperidyl)·di(tridecyl)-1,2,3,4-butane-tetracarboxylate, and 3,9-bis[1,1-dimethyl-2-{tris (2,2,6,6-tetramethyl-4-piperidyloxycarbonyloxy)) butylcarbonyloxy}ethyl]-2,4,8,10-tetraoxaspiro[5.5] undecane.

The antioxidant may be an antioxidant different from the aforementioned NH-type hindered amine compound. As such an antioxidant, for example, at least one of a thioether-based antioxidant or a phenol-based antioxidant can be used. The thioether-based antioxidant is an antioxidant composed of an organic compound in which sulfur is substituted with an organic group. The phenol-based antioxidant is an antioxidant having a phenol group in the chemical structure. At least one antioxidant among thioether antioxidants or phenol antioxidants can capture hydroperoxides.

Examples of the thioether antioxidant include dialkyl thiodipropionates such as dilauryl thiodipropionate, dimyristyl thiodipropionate, and distearyl thiodipropionate, and pentaerythritol tetra (β-alkylthiopropionic acid) esters. Examples of phenol-based antioxidants include: monophenol-based antioxidants such as 2,6-t-butylphenol, 2-t-butyl-4-methoxyphenol, 3-t-butyl-4-methoxyphenol, 2,4-dimethyl-6-t-butylphenol, 2,6-di-t-butyl-p-cresol, 2,6-di-t-butyl-4-ethylphenol, and n-octadecyl-3-(3,5-di-t-butyl-4-hydroxyphenyl) propionate, methyl hydroquinone; bisphenol-based antioxidants, such as 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butyridenebis(3-methyl-6-t-butylphenol), 3,9-bis[1,1-dimethyl-2-[β-(3-t-butyl-4-hydroxy-5-methylphenyl) propionyloxy]ethyl]2,4,8,10-tetraoxaspiro [5.5]undecane, and 2,2'-dihydroxy-3,3'-di(α-methylcyclohexyl)-5,5'-dimethyldiphenylmethane; trisphenol-based antioxidants, such as 1,1,3-tris(2-methyl-4-hydroxy-5-t-butylphenyl)butane, 1,3,5-trimethyl-2,4,6-tris(3,5-t-butyl-4-hydroxybenzyl)benzene, etc.; tetrakisphenol-based antioxidants such as tetrakis-[methylene-3-(3',5'-di-t-butyl-4'-hydroxyphenyl)propionate]methane, and tetrakis-[ethylene-3-(3',5'-di-t-butyl-4'-hydroxyphenyl)propionate]methane; tocopherols such as D-α-tocopherol, L-α-tocopherol, D-β-tocopherol, L-β-tocopherol, D-γ-tocopherol, L-γ-tocopherol, D-δ-tocopherol, and L-δ-tocopherol; and tocotrienols such as D-α-tocotrienol, L-α-tocotrienol, D-β-tocotrienol, L-β-tocotrienol, D-γ-tocotrienol, L-γ-tocotrienol, D-δ-tocotrienol, and L-δ-tocotrienol.

The content of the antioxidant is preferably 0.1% by mass or more, more preferably 0.2% by mass or more, and most preferably 0.3% by mass or more with respect to the total amount of the ink composition. This can more effectively improve the weathering resistance of an adherend. The content of the antioxidant is preferably 5.0% by mass or less, more preferably 3.0% by mass or less, most preferably 2.0% by mass or less with respect to the total amount of the ink composition. This improves dispersibility (or solubility) of an antioxidant contained in an ink composition, which improves inkjet discharge properties of the ink composition.

[Polymerizable Compounds]

A polymerizable compound is a compound having an ethylenically unsaturated double bond which is polymerized by irradiation with an active energy ray. Examples of the active energy ray include electromagnetic waves such as far ultraviolet rays, ultraviolet rays, near ultraviolet rays, visible light waves infrared rays, X-rays, and gamma rays, and electron beams, proton beams, and neutron beams.

The polymerizable compound may be a monofunctional polymerizable compound having one ethylenically unsaturated double bond in the compound, or a polyfunctional polymerizable compound having two or more ethylenically unsaturated double bonds in the compound. The polymerizable compound is a concept including a compound also referred to as an oligomer or a polymer depending on its molecular weight.

Examples of the monofunctional monomer include tetrahydrofurfuryl acrylate (THFA), trimethylolpropane formal acrylate (CTFA), (2-methyl-2-ethyl-1,3-dioxolan-4-yl) acrylate, (2-methyl-2-isobutyl-1,3-dioxolan-4-yl) (meth) acrylate, (cyclohexanespiro-2-(1,3-dioxolan-4-yl)) (meth) acrylate, 4-t-butylcyclohexyl acrylate, which is an alkylcycloalkyl acrylate, benzyl acrylate, 2-phenoxyethyl acrylate, isobornyl acrylate, dicyclopentanyl acrylate, dicyclopentenyl acrylate, dicyclopentenyloxyethyl acrylate, γ-butyrolactone acrylate, cresol acrylate, 2-acryloyloxyethyl phthalate, 2-acryloyloxyethyl-2-hydroxyethyl phthalate, 2-acryloyloxyethyl hexahydrophthalate, 2-acryloyloxypropyl phthalate, paracumylphenoxyethylene glycol acrylate, nonylphenoxy polyethylene glycol acrylate, 1-adamantyl acrylate, cyclohexyl acrylate, 3-3-5-trimethylcyclohexyl acrylate, 2-hydroxy-3-phenoxypropyl acrylate, acryloylmorpholine, N-vinyl caprolactam, imidoacrylate, isooctyl acrylate, tridecyl acrylate, lauryl acrylate, 2-hydroxyethyl acrylate, stearyl acrylate, isodecyl acrylate, caprolactone acrylate, methoxy polyethylene glycol acrylate, methoxy polypropylene glycol acrylate, 2-methoxyethyl acrylate, ethyl carbitol acrylate, 2-ethylhexyl acrylate, and those obtained by adding modification, such as alkoxy modification and caprolactone modification, to these acrylates.

Examples of the multifunctional monomer include ethylene glycol di(meth)acrylate, diethylene glycol di(meth)acrylate, dipropylene glycol di(meth)acrylate, tripropylene glycol di(meth)acrylate, hexanediol di(meth)acrylate, long chain aliphatic di(meth)acrylate, 1,4-butanediol di(meth) acrylate, 1,6-hexanediol di(meth)acrylate, 1,9-nonanediol di(meth)acrylate, neopentyl glycol di(meth)acrylate, hydroxypivalic acid neopentyl glycol di(meth)acrylate, pentaerythritol di(meth)acrylate modified with stearic acid, propyleneglycol di(meth)acrylate, glycerol di(meth)acrylate, triethyleneglycol di(meth)acrylate, 2-(2-vinyloxyethoxy) ethyl acrylate, tetraethylene glycol di(meth)acrylate, tetramethylene glycol di(meth)acrylate, butylene glycol di(meth) acrylate, propoxylated neopentyl glycol di(meth)acrylate, polyethylene glycol di(meth)acrylate, polypropylene di(meth)acrylate, triglycerol di(meth)acrylate, neopentyl glycol modified trimethylol propane di(meth)acrylate, allylated cyclohexyl di(meth)acrylate, methoxylated cyclohexyl di(meth)acrylate, acrylated isocyanurate, bis(acryloxyneopentylglycol) adipate, bisphenol A di(meth)acrylate, tetrabromobisphenol A di(meth)acrylate, bisphenol S di(meth) acrylate, butanediol di(meth)acrylate, phthalic acid di(meth) acrylate, phosphoric acid di(meth)acrylate, zinc di(meth) acrylate, pentaerythritol tetraacrylate, ditrimethylolpropane tetraacrylate, dipentaerythritol pentaacrylate, dipentaerythritol hexaacrylate, trimethylolpropane tri(meth)acrylate, pentaerythritol tri(meth)acrylate, glycerin tri(meth)acrylate, and (meth)acrylates which differ from the above in terms of modification numbers, modification species, and structures.

[Polymerization Initiator]

The ink composition according to the present embodiment may optionally contain a polymerization initiator. The polymerization initiator is not particularly limited as long as it promotes the polymerization reaction of the polymerizable compound in the ink composition by irradiation with an active energy ray. In the ink composition according to the present embodiment, the polymerization initiator is not necessarily required, and for example, when an electron beam is used as an active energy ray, the polymerization initiator may not be used.

Examples of the polymerization initiator include aromatic ketones including thioxanthone, α-aminoalkylphenones, α-hydroxyketones, acylphosphine oxides, aromatic onium salts, organic peroxides, thio compounds, hexaarylbiimidazole compounds, ketoxime ester compounds, borate compounds, azinium compounds, metallocene compounds, active ester compounds, compounds having a carbon halogen bond, and alkylamine compounds.

The content of the polymerization initiator may be an amount capable of appropriately initiating the polymerization reaction of the polymerizable compound, and is preferably 1.0% by mass or more, more preferably 2.0% by mass or more, and most preferably 3.0% by mass or more, with respect to the total amount of the ink composition. Further, the content is preferably 20.0% by mass or less, more preferably 15.0% by mass or less, and most preferably 13.0% by mass or less with respect to the total amount of the ink composition.

[Polymerization Inhibitor]

The ink composition according to the present embodiment may optionally contain a polymerization inhibitor. The polymerization inhibitor is not particularly limited, and polymerization inhibitors such as diphenyl picryl hydrazide, tri-p-nitrophenylmethyl, p-benzoquinone, p-tert-butylcatechol, picric acid, copper chloride, methylhydroquinone, methoquinone, tert-butylhydroquinone, phenothiazines, nitroamines, and the like can be used.

[Photostabilizer]

The ink composition according to the present embodiment may optionally contain a photostabilizer different from the above-mentioned ultraviolet absorbers and antioxidants. Examples of the photostabilizer include NOR-type hindered amine compounds.

The NOR-type hindered amine compound has a structure represented by the following formula, and can capture hydroperoxides by the NOR group in the same manner as the antioxidant described above.

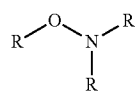
[Chem. 2]

Examples of such NOR-type hindered amine compounds include dimethyl-1-(2-hydroxyethyl)-4-hydroxy-2,2,6,6-tetramethylpiperidine succinate, 2,4-bis[N-butyl-N-(1-cyclohexyloxy-2,2,6,6-tetramethylpiperidin-4-yl)amino]-6-(2-hydroxyethylamine)-1,3,5-triazine, decanedioic acid, bis (2.2.6.6-tetramethyl-1-(octyloxy)-4-piperidinyl) ester, 2,4-bis[N-butyl-N-(1-cyclohexyloxy-2,2,6,6-tetramethylpiperidin-4-yl)amino]-6-(2-hydroxyethylamino)-1,3,5-triazine, and bis(1-undecanooxy-2,2,6,6-tetramethylpiperidin-4-yl) carbonate.

A photostabilizer other than the NOR-type hindered amine compound may be contained. For example, conventionally known photostabilizers such as NR-type hindered amine compounds can be mentioned.

The content of the photostabilizer is preferably 0.1% by mass or more, more preferably 0.3% by mass or more, and most preferably 0.5% by mass or more, with respect to the total amount of the ink composition. The content of the photostabilizer is preferably 5.0% by mass or less, more preferably 4.0% by mass or less, and most preferably 3.0% by mass or less, with respect to the total amount of the ink composition.

[Other Additives]

The ink composition according to the present embodiment may contain various additives such as a solvent, a plasticizer, a leveling agent, a resin, and a surface adjusting agent as other additives.

The ink composition according to the present embodiment may contain a coloring material (dye or pigment) used in ordinary ink compositions for inkjet. The content of the coloring material is preferably 3.0% by mass or less, more preferably 1.0% by mass or less, more preferably 0.5% by mass or less, and most preferably 0.2% by mass or less, with respect to the total amount of the ink composition. When the content of the coloring material (dye/pigment) is small, the visibility of the adherend is improved.

<2. Method for Producing Ink Compositions>

The method for producing the ink composition is not particularly limited, and a conventionally known method can be used. In the ink composition, a polymerizable compound, an ultraviolet absorber, an antioxidant, and the like are dispersed using a dispersing machine, then, if necessary, a polymerization initiator, a polymerization inhibitor, a leveling agent, and the like are added and uniformly stirred to obtain a mixture, and the obtained mixture is filtered through a filter to obtain an ink composition.

(Viscosity and Surface Tension of Ink Compositions)

The viscosity of the ink composition according to the present embodiment is preferably 30 mPa·s or less, more preferably 25 mPa·s or less, and most preferably 20 mPa·s or less at a discharging temperature (for example, 40° C.) from the viewpoints of inkjet discharging properties and discharging stability. The viscosity of the ink composition according to the present embodiment is preferably 3 mPa·s or more, more preferably 4 mPa·s or more, and most preferably 5 mPa·s or more.

When the discharging temperature is room temperature (for example, 25° C.), the viscosity is preferably 30 mPa·s or less, more preferably 25 mPa·s or less, and most preferably 20 mPa·s or less from the viewpoints of inkjet discharging properties and discharging stability. The viscosity of the ink composition according to the present embodiment is preferably 3 mPa·s or more, more preferably 4 mPa·s or more, and most preferably 5 mPa·s or more.

Further, the surface tension of the ink composition according to the present embodiment is preferably 17 mN/m or more, more preferably 20 mN/m or more, and most preferably 23 mN/m or more at 25° C. from the viewpoints of discharging properties, discharging stability, and leveling properties to a substrate of inkjet. The surface tension of the ink composition according to the present embodiment is preferably 40 mN/m or less, more preferably 38 mN/m or less, and most preferably 36 mN/m or less.

Next, a printed matter obtained by the ink composition according to the present embodiment will be described.

<3. Printed Matter>

A printed matter obtained using the ink composition according to the above embodiment includes at least an adherend and a weatherable layer laminated on the surface of the adherend. This weatherable layer contains a cured product of the polymerizable compound contained in the ink composition according to the above embodiment, the ultraviolet absorber and the antioxidant. By forming such a weatherable layer on the surface of the adherend, the weathering resistance of the adherend can be improved. Further, discoloration (yellowing) of the weatherable layer due to exposure of the weatherable layer for a long time can be effectively suppressed. The adherend may be the recording medium itself, or may be an article including the recording medium and a colored layer laminated on a part or the entirety of the surface of the recording medium.

Hereinafter, each layer constituting the printed matter will be described.

[Substrate (Recording Medium)]

A substrate (recording medium) is not particularly limited, and may be a non-absorbent substrate such as a resin substrate or a metal plate glass, an absorbent substrate such as paper or fabric, or a surface-coated substrate such as a substrate having a receiving layer, and various substrates can be used.

Examples of the non-absorbent substrate include resin substrates such as a polyester-based resin, a polypropylene-based synthetic paper, a vinyl chloride resin, a polyimide resin, a polycarbonate-based resin, a styrene-based resin, an acrylic-based resin, an ABS-based resin, and a polyurethane-based resin, metals, metal foil-coated paper, glass, synthetic rubber, and natural rubber.

Examples of the absorbent substrate include woody paper, medium-quality paper, high-quality paper, cotton, artificial fiber textile, silk, hemp, fabric, nonwoven fabric, and leather.

Examples of the surface-coated substrate include coated paper, art paper, cast paper, lightweight coated paper, and fine coated paper.

[Colored Layer]

The printed matter may include a colored layer. The colored layer is a layer containing a coloring material (dye/pigment) used in ordinary ink compositions, and is a layer formed by an ink composition coated mainly on the surface of a substrate or on the surface of a layer (a primer layer, a coating layer, a layer of a receiving solution, or the like) formed on the surface of the substrate. The ink composition forming this colored layer may be an active energy ray-curable ink composition, a solvent-type ink composition containing a coloring material and a solvent, or an aqueous-type ink composition containing a coloring material and water. The colored layer may be a single layer or a plurality of layers (for example, a plurality of layers including layers of yellow ink, magenta ink, cyan ink, and black ink). By forming a weatherable layer formed on the surface of an adherend including a colored layer formed on a part or the entirety of the surface of the recording medium, weathering resistance of the colored layer can be made extremely excellent, and the discoloration (yellowing) of the weatherable layer due to exposure of the weatherable layer for a long time can be effectively suppressed, so that design properties of an image is not changed. Although the adherend to which the ink composition according to the above embodiment is applied may be the surface itself of the recording medium, the ink composition according to the above embodiment is particularly preferably applied to the surface of a colored layer to form a weatherable layer.

The colored layer may contain a resin. When a resin is contained in the colored layer, this resin may be a binder resin, a resin emulsion, or a polymer dispersant contained in the ink composition, as it is. Alternatively, the resin may be a cured product obtained by irradiating the polymerizable compound contained in the ink composition with active energy rays, after the ink composition is discharged on the surface of the substrate (recording medium).

The coating method of the ink composition for forming the colored layer is not particularly limited. Examples thereof include a spray method, a coater method, an inkjet method, a gravure method, and a flexo method. Among them, discharging (coating) is preferable performed by an inkjet method. In the inkjet method, it is easy to discharge (apply) an ink onto any portion of the substrate or to discharge (apply) an ink onto the entire surface of the substrate.

The coloring material of the ink composition forming the colored layer is not particularly limited, and may be dye-based or pigment-based. It is preferable to use a pigment-based ink composition that can render the colored layer water resistant and light resistant. The pigment that can be used in the ink composition to form the colored layer is not particularly limited. Examples of the pigment include organic pigments and inorganic pigments used in conventional ink compositions. These may be used alone or in combination of two or more types thereof. Examples of the organic pigment include organic solid-solution pigments, such as insoluble azo pigments, soluble azo pigments, derivatives from dyes, phthalocyanine-based organic pigments, quinacridone-based organic pigments, perylene-based organic pigments, dioxazine-based organic pigments, nickel azo-based pigments, isoindolinone-based organic pigments, pyranthron-based organic pigments, thioindigo-based organic pigments, condensed azo-based organic pigments, benzimidazolone-based organic pigments, quinophthalon-based organic pigments, isoindoline-based organic pigments, quinacridone-based solid-solution pigments, and perylene-based solid solution pigments. Examples of inorganic pigments include titanium oxide and zinc oxide. Examples of other pigments include carbon black. The pigment that can be used in the ink composition may be a combination of a plurality of organic pigments and inorganic pigments, or a combination of a pigment dispersion dispersed in a water-soluble solvent using a pigment dispersant and a self-dispersion pigment.

[Weatherable Layer]

The weatherable layer is a layer formed of the ink composition containing the cured product of the polymerizable compound according to the above embodiment, an ultraviolet absorber, and an antioxidant. Specifically, it is a layer containing the cured product of the polymerizable compound formed by discharging the ink composition containing a polymerizable compound, an ultraviolet absorber, and an antioxidant onto a surface of an adherend by an inkjet method and irradiating the ink composition discharged with an active energy ray, the ultraviolet absorber, and the antioxidant.

The weatherable layer contains an ultraviolet absorber having a maximum absorption wavelength in a wavelength range of 315 nm or more and 400 nm or less and an absorbance area $Ab$ of 25.0 or more and a predetermined antioxidant. Thus, weathering resistance of the adherend can be improved.

The lower limit of the thickness of the weatherable layer is not particularly limited, but is preferably 10 μm or more, more preferably 15 μm or more, and most preferably 20 μm. With the weatherable layer having a thickness of 10 μm or more, weathering resistance of the adherend can be more effectively improved, and a printed matter having higher weathering resistance can be obtained. The upper limit of the thickness of the weatherable layer is not particularly limited, but is preferably 200 μm or less, more preferably 150 μm or less, and most preferably 100 μm or less from the viewpoint of productivity and cost of printed matter.

Since the weatherable layer formed by the ink composition of the present embodiment contains a predetermined ultraviolet absorber, the weatherable layer can impart high weathering resistance to the adherend. Therefore, as long as the weatherable layer is formed by the ink composition of the present embodiment, a sufficiently high weathering resistance can be imparted to the adherend even if the weatherable layer is thin, for example, about 10 μm.

Further, the weatherable layer may have a uniform thickness (for example, the thickness of the weatherable layer described above), but may have a non-uniform thickness. For example, the surface may be made matte or glossy, or the weatherable layer may be provided with irregularities such as wood-like, leather-like, hemp-like, and fallen leaves-like surfaces. With such a weatherable layer having a non-uniform thickness, occurrence of yellowing and cracks due to exposure for a long time can be effectively suppressed, and a weatherable layer having high design properties can be obtained. The weatherable layer can be made to have a non-uniform thickness by adjusting conditions such as the discharging amount of the ink composition and the time from discharging of the ink composition till irradiation of active energy rays.

Such a weatherable layer having a non-uniform thickness may be formed by a method of increasing or decreasing an amount of an ink composition in one discharge, depending on the discharge position, or may be formed by discharging a plurality of ink compositions at the same position to make a difference in unevenness.

Further, the absorbance area $Abl$ in the wavelength range of 315 nm or more and 400 nm or less of the weatherable layer itself is preferably 30.0 or more, more preferably 35.0 or more, and most preferably 40.0 or more. When the absorbance area is 30.0 or more, weathering resistance of the adherend can be improved. The absorbance area $Abl$ in the wavelength range of 315 nm or more and 400 nm or less of the weatherable layer itself can be obtained by peeling the weatherable layer from the printed matter and integrating the absorbance in the wavelength range of 315 nm or more and 400 nm or less. When a measurement interval of the measurement wavelength is, for example, 0.5 nm, the integrated value of the absorbance refers to an area obtained by adding an area of a quadrangle (trapezoid) calculated from ((absorption at wavelength X nm)+(absorption at wavelength (X+0.5) nm))×0.5/2, with respect to X, between 315 nm and 400 nm.

The weatherable layer may contain a coloring material (dye/pigment) used in ordinary ink compositions for inkjet. The content of the coloring material is preferably 3.0% by mass or less, more preferably 1.0% by mass or less, more preferably 0.5% by mass or less, and more preferably 0.2% by mass or less, with respect to the total amount of the weatherable layer. Most preferably, no coloring material is contained. When the content of the coloring material (dye/pigment) is small, visibility of the adherend is improved.

In particular, when a weatherable layer is formed on the surface of a colored layer forming an image, the content of the coloring material (dye/pigment) in the weatherable layer is small, which improves visibility of the image.

<4. Recording Method>

The recording method in which the ink composition according to the above embodiment is used to record on the surface of an adherend is a recording method in which an active energy ray-curable ink composition is discharged by an inkjet method. By discharging the ink composition by the inkjet method, it is possible to handle production of printed matters in a small lot.

The inkjet recording apparatus can be applied to any inkjet recording apparatus such as a piezo system, a thermal system, or an electrostatic system.

The ink composition discharged by the inkjet method is irradiated with an active energy ray. Examples of the active energy ray include electromagnetic waves such as far ultraviolet rays, ultraviolet rays, near ultraviolet rays, visible light waves, infrared rays, X-rays, and gamma rays, and electron beams, proton beams, and neutron beams. Light sources for radiating active energy rays are not particularly limited, and examples thereof include a high-pressure mercury lamp, a metal halide lamp, a low-pressure mercury lamp, an ultrahigh-pressure mercury lamp, an ultraviolet laser, sunlight, and an LED lamp. It is more preferable to use an LED lamp as a light source from the viewpoint of energy saving and high degree of freedom in design equipment of the printing apparatus.

By this recording method, a printed matter having high weathering resistance can be obtained.

<5. Method of Producing Printed Matters>

The recording method of discharging the ink composition according to the above embodiment onto the surface of a substrate can also be defined as a method of producing a printed matter.

By this recording method, a printed matter having high weathering resistance can be obtained.

EXAMPLES

Hereinafter, the present invention will be described in more detail with reference to the Examples, but the present invention is not limited to these descriptions.

1. Preparation of Ink Compositions

Ink compositions of the Experimental Examples and Comparative Examples were produced. Specifically, the ink compositions of the Examples and the Comparative Examples were prepared so that a polymerizable compound, an ultraviolet absorber, an antioxidant, a polymerization initiator, a polymerization inhibitor, and a photostabilizer were contained in the proportions given in the following Table. The units in the Table are % by mass.

TABLE 2

| | | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Polymerizable compound | Isobornyl acrylate | 34.46 | 34.46 | 34.46 | 33.46 | 36.96 | 34.96 | 34.96 | 34.96 | 34.46 | 34.46 |
| | 2-phenoxyethyl acrylate | 30 | 30 | 30 | 30 | 30 | 30 | 30 | 30 | 30 | 30 |
| | N-vinyl caprolactam | 10 | 10 | 10 | 10 | 10 | 10 | 10 | 10 | 10 | 10 |
| | 1,6-hexanediol diacrylate | 15 | 15 | 15 | 15 | 15 | 15 | 15 | 15 | 15 | 15 |
| Polymerization inhibitor | Phenotiazine | 0.02 | 0.02 | 0.02 | 0.02 | 0.02 | 0.02 | 0.02 | 0.02 | 0.02 | 0.02 |
| Polymerization initiator | Monoacyl phosphine oxide (TPO) | 8 | 8 | 8 | 8 | 8 | 8 | 8 | 8 | 8 | 8 |
| Leveling agent | Silicon polyether acrylate | 0.02 | 0.02 | 0.02 | 0.02 | 0.02 | 0.02 | 0.02 | 0.02 | 0.02 | 0.02 |
| Ultraviolet absorber | Ultraviolet absorber (c) | 2.0 | 2.0 | | | | 2.0 | | | | |
| | Ultraviolet absorber (d) | | | 2.0 | 2.0 | | | | | | |
| | Ultraviolet absorber (a) | | | | | | | 2.0 | | 2.0 | |
| | Ultraviolet absorber (b) | | | | | | | | 2.0 | | 2.0 |
| Antioxidant | Tinuvin 770(NH-type hindered amine compound) | 0.5 | | 0.5 | 0.5 | | | | | 0.5 | 0.5 |
| | AO-412S(Thioether-based antioxidant) | | 0.5 | | | | | | | | |
| Photostabilizer | Tinuvin 123(NOR-type hindered amine compound) | | | | | | 1.0 | | | | |
| | Total | 100.00 | 100.00 | 100.00 | 100.00 | 100.00 | 100.00 | 100.00 | 100.00 | 100.00 | 100.00 |

In the Table, the UV absorber (c) is a triazine UV absorber (2,4,6-tris [4-(1-octyloxycarbonyl)ethoxy-2-hydroxyphenyl]-1,3,5-triazine) (CAS No. 348144-62-7, maximum absorption wavelength: 350 nm, absorbance area Ab: 32.1).

In the Table, the ultraviolet absorber (d) is a triazine ultraviolet absorber (isooctyl 2-[4-[4,6-bis[(1,1'-biphenyl)-4-yl]-1,3,5-triazine-2-yl]-3-hydroxyphenoxy] propanoate) (CAS No. 204848-45-3, maximum absorption wavelength: 322 nm, absorbance area Ab: 52.4).

In the Table, the ultraviolet absorber (a) is a triazine UV absorber (2-[4-([2-hydroxy-3-dodecyloxypropyl)oxy]-2-hydroxyphenyl]-4,6-bis(2,4-dimethylphenyl)-1,3,5-triazine CAS No. 153519-44-9 maximum absorption wavelength: 290 nm, absorbance area Ab: 19.8).

In the Table, the ultraviolet absorber (b) is a triazine ultraviolet absorber (2-[4-[(2-hydroxy-3-(2'-ethyl)hexyl)oxy]-2-hydroxyphenyl]-4,6-bis(2,4-dimethylphenyl)-1,3,5-triazine, CAS No. 137658-79-8 maximum absorption wavelength: 290 nm, absorbance area Ab: 23.9).

2. Preparation of Ink Compounds for Colored Layers

Ink compositions for colored layers were produced. Specifically, each of the ink compositions for colored layers was prepared so that a polymerizable compound, a polymerization initiator, a polymerization inhibitor, a leveling agent, a pigment, and a pigment dispersant were contained in the proportions given in the following Table. The units in the Table are % by mass.

TABLE 3

| | | Content (% by mass) |
|---|---|---|
| Polymerizable compound | Isobornyl acrylate | 34.46 |
| | 2-phenoxyethyl acrylate | 35.00 |
| | N-vinyl caprolactam | 10.00 |
| | 1,6-hexanediol diacrylate | 10.00 |
| Polymerization inhibitor | Phenotiazine | 0.02 |
| Polymerization initiator | Monoacyl phosphine oxide | 8.00 |
| Leveling agent | Silicon polyether acrylate | 0.02 |
| Pigment dispersant | BYK-JET9151 | 0.80 |
| Pigment | Pigment yellow 155 | 1.70 |

3. Production of Printed Matters

Printed matters 1 to 6 and 8 to 14 were produced using the ink compositions of the Examples and Comparative Examples. Specifically, a colored layer was formed by discharging an ink compound for colored layers onto the surface of a substrate using an inkjet recording apparatus and irradiating the substrate with an LED lamp having a wavelength of 385 nm as an active energy ray. Next, the ink compositions of the Examples and the Comparative Examples were discharged onto the surface of the substrate from above the colored layer by using an inkjet recording apparatus, and ultraviolet rays with a wavelength of 385 nm were radiated from the LED lamp to produce printed matters 1 to 6 and 8 to 14. At this time, the thickness of the weatherable layer was 20 μm. The printed matter 7 was prepared without using the ink compositions of the Examples or the Comparative Examples, and consisted of the substrate and the colored layer and did not have a weatherable layer.

When the absorbance areas of the weathering layers of the printed matter 1 and the printed matter 3 in the wavelength range of 315 nm or more and 400 nm or less were measured, the absorbance area of the weathering layer of the printed matter 1 was 36 and that of the printed matter 3 was 45.

4. Evaluation (1) Weathering Resistance Evaluation (Weathering Resistance of Adherends)

Weathering resistance of the printed matters 1 to 14 was evaluated. Specifically, the printed matters 1 to 14 were irradiated with UV light from the weatherable layer side using a weathering resistance evaluation apparatus (EYE Super UV Tester manufactured by Iwasaki Electric Co., Ltd.) under a test condition of output of 100 mW/cm².

With respect to each of the colored layers of the printed matters 1 to 14 after the test, L*, a*, and b* values at CIE color coordinates by a standard light source D50 were measured according to JIS Z 8722 using x-rite eXact manufactured by company X-RITE, and extents of weathering degradation (discoloration) of the colored layers before being placed in the test apparatus and after irradiation for 100 hours were evaluated. Specifically, the evaluation was performed by calculating color difference $\Delta E^*$ according to the following calculation method, and evaluating the color difference $\Delta E^*$ based on the following evaluation criteria. The evaluation results are shown in Table 4 as "Weathering resistance". Calculation method of $\Delta E^*$: $\Delta E^* = [(\Delta L^*)^2 + (\Delta a^*)^2 + (\Delta b^*)^2]^{1/2}$ All of $\Delta L^*$, $\Delta a^*$, and $\Delta b^*$ are equal to [value after being placed in the test apparatus—value before being placed in the test apparatus].

(Evaluation Criteria)

5: Color difference $\Delta E^*$ is less than 19.9.

4: Color difference $\Delta E^*$ is 20 or more and less than 24.9.

3: Color difference $\Delta E^*$ is 25.0 or more and less than 29.9.

2: Color difference $\Delta EU$ is 30.0 or more and less than 35.0.

1: Color difference $\Delta EU$ is 35.0 or more.

(2) Yellowing Evaluation (Yellowing Change of Weatherable Layer)

Yellowing of printed matters obtained using the ink compositions of the Examples and the Comparative Examples was evaluated. Specifically, weathering resistance test was performed in the same manner as in the above-described weathering resistance test, and with regard to each of the weatherable layers of the printed matters before being placed in the test apparatus and the printed matters after 200 hours irradiation, extents of weathering resistance degradation (yellowing) were evaluated in the same manner as in the weathering resistance test. Specifically, the evaluation was performed by calculating color difference $\Delta b^*$ according to the following calculation method, and evaluating the color difference $\Delta b^*$ based on the following evaluation criteria. The evaluation results are shown in Table 4 as "Yellowing". $\Delta b^*$ is equal to [value after being placed in the test apparatus−value before being placed in the test apparatus].

(Evaluation Criteria)

5: Color difference $\Delta b^*$ is less than 5.0.

4: Color difference $\Delta b^*$ is 5.0 or more and less than 6.9.

3: Color difference $\Delta b^*$ is 7.0 or more and less than 8.9.

2: The color difference $\Delta b^*$ is 9.0 or more and less than 10.0.

1: The color difference $\Delta b^*$ is 10.0 or more.

(3) Crack Check Test (Crack Check of Colored Layers)

Cracks in printed matters obtained using the ink compositions of the Examples and the Comparative Examples were checked. Specifically, weathering resistance was tested in the same manner as in the above-described weathering resistance test, and with regard to the colored layer and the weatherable layer in each of the printed matters before being placed in the test apparatus and the printed matters after 300 hours irradiation, presence or absence of cracks was visually checked. The evaluation results are shown in Table 4 as "Cracks".

(Evaluation Criteria)

Absence: No cracks were observed.

Presence: Cracks were observed.

TABLE 4

| | | Printed matter 1 | Printed matter 2 | Printed matter 3 | Printed matter 4 | Printed matter 5 | Printed matter 6 | Printed matter 7 | Printed matter 8 | Printed matter 9 | Printed matter 10 | Printed matter 11 |
|---|---|---|---|---|---|---|---|---|---|---|---|---|
| Ink composition | | Example 1 | Example 2 | Example 3 | Example 4 | Without weatherable layer | Comparative Example 1 | Comparative Example 2 | Comparative Example 3 | Comparative Example 4 | Comparative Example 5 | Comparative Example 6 |
| Weathering resistance | ΔE | 18.3 | 18.1 | 15.6 | 15.2 | 76.0 | 47.3 | 20.5 | 40.5 | 35.5 | 39.8 | 33.1 |
| | Evaluation | 5 | 5 | 5 | 5 | 1 | 2 | 4 | 1 | 1 | 1 | 1 |
| Yellowing | Δb+ | 11.2 | 13.1 | 10.1 | 3.9 | 0.3 | 32.3 | 15.1 | 25.7 | 23.1 | 21.2 | 22.1 |
| | Evaluation | 4 | 3 | 5 | 5 | 5 | 1 | 1 | 1 | 1 | 1 | 1 |
| Cracks | | Not occurred | Not occurred | Not occurred | Not occurred | Occurred | Occurred | Occurred | Occurred | Occurred | Not occurred | Not occurred |

As can be seen from Table 4, the ink compositions of Examples 1 to 4, which contained an ultraviolet absorber having a maximum absorption wavelength in a wavelength range of 315 nm or more and 400 nm or less and an absorbance area Ab of 25.0 or more and which contained an antioxidant, were excellent in weathering resistance of the resulting printed matters, yellowing of the weatherable layers was small, and no cracks were generated in the colored layers.

Among them, the ink compositions of Examples 1, 3, and 4 containing an NH-type hindered amine compound as the antioxidant showed little yellowing in the weatherable layer, as compared with the ink composition of Example 2. Further, the ink composition of Example 4 containing a photo stabilizer (NOR-type hindered amine compound) showed less yellowing in the weatherable layer as compared with the ink composition of Example 3.

Further, comparing Examples 1 and 3 having the same compositions except for the type of the ultraviolet absorber, Example 3 exhibited a lower degree of yellowing. It is understood that yellowing was suppressed by using the ink composition containing the ultraviolet absorber having a greater absorbance area Ab.

On the other hand, in the printed matter obtained using the ink composition of Comparative Example 1, which contained neither the ultraviolet absorber nor the antioxidant, the colored layer had deteriorated weathering resistance and cracks were also generated. Further, in the printed matter obtained using the ink composition of Comparative Example 2, which contained an ultraviolet absorber having a maximum absorption wavelength in a wavelength range of 315 nm or more and 400 nm or less and an absorbance area Ab of 25.0 or more and which did not contain an antioxidant, the weatherable layer was significantly yellowed and cracks were also generated. Further, in the printed matters obtained by using the ink compositions of Comparative Examples 3 and 4, which contained an ultraviolet absorber having an absorbance area Ab of less than 25.0 and which did not contain an antioxidant, the weatherable layer was significantly yellowed, the weathering resistance of the colored layer was deteriorated, and cracks were also generated. Further, in the printed matters obtained by using the ink compositions of Comparative Examples 5 and 6, which contained an ultraviolet absorber having an absorbance area Ab of less than 25.0 and which contained an antioxidant, the weatherable layer was significantly yellowed, and the weathering resistance of the colored layer was deteriorated.

The printed matter 5 having no weatherable layer had poor weathering resistance and had cracks generated.

The invention claimed is:

1. An active energy ray-curable ink composition to be discharged by an inkjet method, comprising:
   a polymerizable compound, an ultraviolet absorber, and an antioxidant,
   the ultraviolet absorber having a maximum absorption wavelength in a wavelength range of 315 nm or more and 400 nm or less, a medium containing the ultraviolet absorber at a concentration of 20 ppm having an absorbance area Ab in a wavelength range of 315 nm or more and 400 nm or less of 25.0 or more, and
   a NOR-type hindered amine compound as a light stabilizer.

2. The ink composition according to claim 1, wherein the antioxidant includes an NH-type hindered amine compound.

3. The ink composition according to claim 1, wherein the content of a coloring material is 1.0% by mass or less with respect to the total amount of the ink composition.

4. A printed matter, comprising an adherend and a weatherable layer formed on the surface of the adherend,
   the weatherable layer including a cured product of a polymerizable compound, an ultraviolet absorber, and an antioxidant,
   the ultraviolet absorber having a maximum absorption wavelength in a wavelength range of 315 nm or more and 400 nm or less, a medium containing the ultraviolet absorber at a concentration of 20 ppm having an absorbance area Ab in a wavelength range of 315 nm or more and 400 nm or less of 25.0 or more, and
   the weatherable layer including a NOR-type hindered amine compound as a light stabilizer.

5. The printed matter according to claim 3, wherein the weatherable layer has an absorbance area Abl in a wavelength range of 315 nm or more and 400 nm or less of 30.0 or more.

6. A recording method, comprising discharging an active energy ray-curable ink composition by an inkjet method,
   the ink composition comprising a polymerizable compound, an ultraviolet absorber, and an antioxidant,
   the ultraviolet absorber having a maximum absorption wavelength in a wavelength range of 315 nm or more and 400 nm or less, a medium containing the ultraviolet absorber at a concentration of 20 ppm having an absorbance area Ab in a wavelength range of 315 nm or more and 400 nm or less of 25.0 or more, and
   the ink composition further comprising a NOR-type hindered amine compound as a light stabilizer.

7. A method for producing a printed matter, comprising discharging an active energy ray-curable ink composition by an inkjet method,
   the ink composition including a polymerizable compound, an ultraviolet absorber, and an antioxidant,
   the ultraviolet absorber having a maximum absorption wavelength in a wavelength range of 315 nm or more and 400 nm or less, and a medium containing the ultraviolet absorber at a concentration of 20 ppm having an absorbance area Ab in a wavelength range of 315 nm or more and 400 nm or less of 25.0 or more, and the ink composition further comprising a NOR-type hindered amine compound as a light stabilizer.

8. The ink composition according to claim 2, wherein the content of a coloring material is 1.0% by mass or less with respect to the total amount of the ink composition.

* * * * *